United States Patent [19]
Slat et al.

[11] Patent Number: 5,733,100
[45] Date of Patent: Mar. 31, 1998

[54] CYLINDRICAL OBJECT PALLETIZER

[75] Inventors: William A. Slat, Brooklyn; David E. Rediess, Redford, both of Mich.; Richard F. Nichols, Douglasville, Ga.

[73] Assignee: Plastipak Packaging, Inc., Plymouth, Mich.

[21] Appl. No.: 728,041

[22] Filed: Oct. 9, 1996

[51] Int. Cl.$^6$ ............................................. B65G 57/22
[52] U.S. Cl. ........................... 414/791.7; 414/789.6; 414/791.6; 414/794.7; 198/418.5
[58] Field of Search .................. 414/789.6, 791.7, 414/792.6, 791.6, 789.5, 786, 794.7; 198/418.5, 429

[56] References Cited

U.S. PATENT DOCUMENTS

| | | |
|---|---|---|
| 2,470,795 | 5/1949 | Socke ............................ 198/418.5 |
| 2,949,179 | 8/1960 | Busse . |
| 3,219,203 | 11/1965 | Jeremiah ........................ 414/791.7 |
| 3,643,822 | 2/1972 | Birchall ......................... 414/791.6 |
| 3,682,290 | 8/1972 | Von Gal, Jr. .................. 414/791.7 |
| 3,941,236 | 3/1976 | Hagedorn ...................... 414/794.7 |
| 4,041,674 | 8/1977 | Reid ............................. 198/418.5 |
| 4,154,347 | 5/1979 | Vandermeer et al. . |
| 4,500,229 | 2/1985 | Cole et al. . |
| 4,638,903 | 1/1987 | Kimura ......................... 198/429 |
| 4,667,808 | 5/1987 | Mastak ......................... 414/791.7 |
| 4,711,612 | 12/1987 | Kwauka ........................ 414/792.6 |
| 4,753,564 | 6/1988 | Pearce et al. . |
| 4,759,673 | 7/1988 | Pearce et al. . |
| 4,934,508 | 6/1990 | Vandermeer et al. . |
| 4,978,275 | 12/1990 | Reid et al. . |
| 4,990,034 | 2/1991 | Kapke et al. . |
| 5,080,551 | 1/1992 | Jerred . |
| 5,267,590 | 12/1993 | Pringle ......................... 414/791.7 |
| 5,271,709 | 12/1993 | Wandermeer et al. . |
| 5,310,307 | 5/1994 | Vandermeer et al. . |
| 5,320,457 | 6/1994 | Vandermeer et al. . |
| 5,320,478 | 6/1994 | Gonsowski et al. . |
| 5,333,722 | 8/1994 | Ouellette . |
| 5,437,533 | 8/1995 | Vandermeer et al. . |
| 5,501,553 | 3/1996 | Simkowski . |
| 5,522,692 | 6/1996 | Simkowski . |
| 5,585,066 | 12/1996 | Weiss . |

*Primary Examiner*—Karen B. Merritt
*Assistant Examiner*—Douglas Hess
*Attorney, Agent, or Firm*—Bachman & LaPointe, P.C.

[57] ABSTRACT

A palletizer of the present invention for arranging objects in a honeycomb pattern is disclosed. The palletizer comprises a mechanism for transporting the objects from an object source, a mechanism for arranging the objects into single file while the mechanism for transporting moves the objects, a first area for receiving groups of the objects comprising a number of the objects arranged into the single file. The first area has a depth to which each of the groups of objects travel after entering the first area. The palletizer further includes a mechanism for alternating the depth between a greater and lesser depth such that every other one of the groups extends to the lesser depth and all other ones of the groups extend to the greater depth for forming the objects into the honeycomb pattern. A second area is provided for collecting the objects as the objects are arranged in the honeycomb pattern and a first container moving mechanism is provided for moving the groups of the objects into the second area.

20 Claims, 9 Drawing Sheets

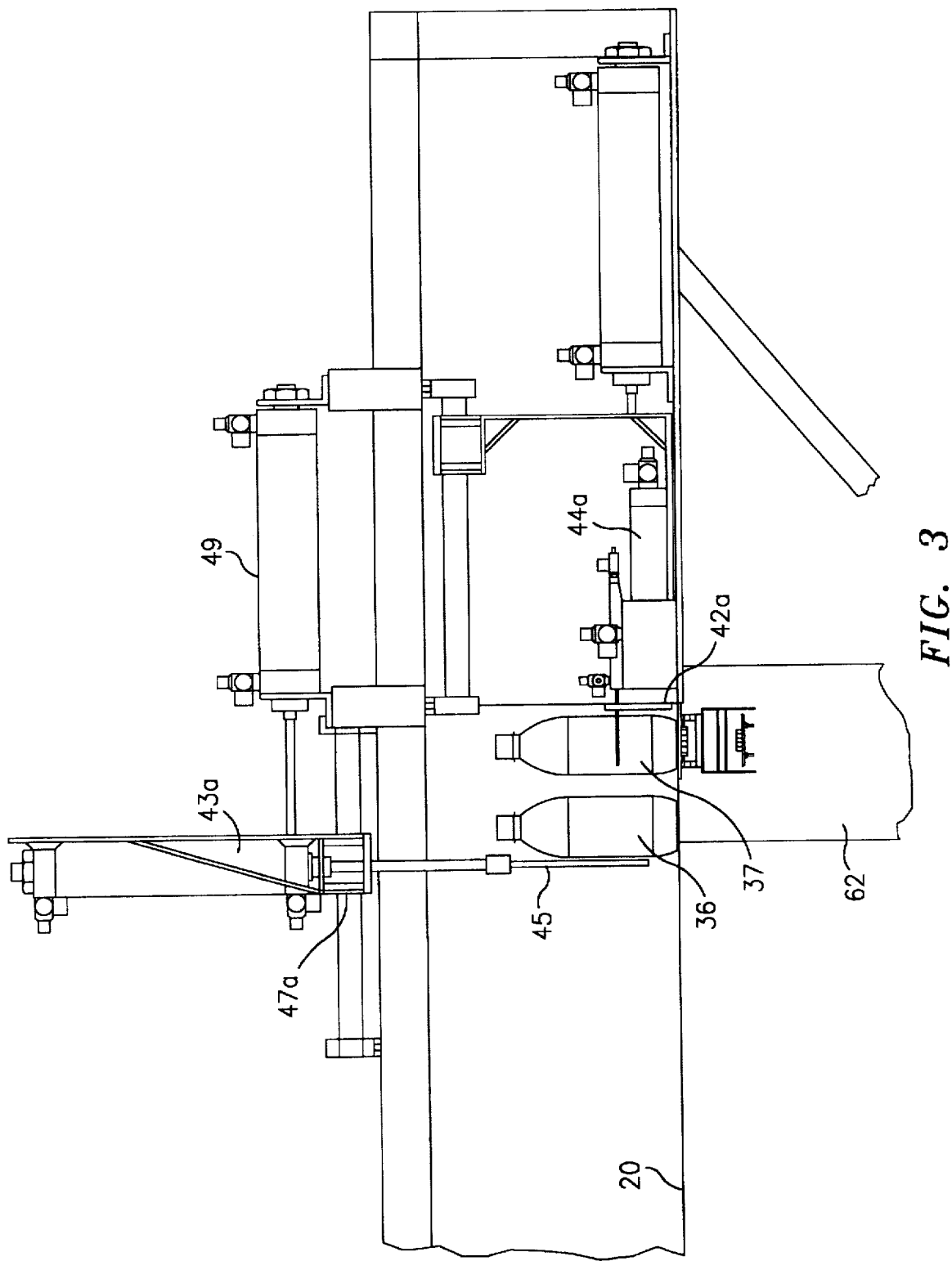

CYLINDRICAL OBJECT PALLETIZER

BACKGROUND OF THE INVENTION

The present invention is directed to devices for palletizing objects, and more particularly, to a mechanism for arranging containers or the like in a variety of patterns, including honeycomb and parallel-square patterns, and palletizing the containers in the same pattern in which it was arranged.

In the container industry, empty containers of various sizes and configurations are typically transported to canners or bottlers on pallets. So as to more effectively use the defined usable surface area of the pallet, the containers are commonly arranged in a honeycomb pattern on the pallet, wherein the honeycomb pattern includes nested parallel rows with the containers of alternate rows being offset one container radius relative to the containers of the remaining row. Two common variations of the honeycomb pattern exist which are used in practice. The first configuration, commonly referred to as the No. 1 configuration, shown in FIG. 1a, includes a pattern where an extra column of containers is added so that the first and last rows of the honeycomb pattern and each alternating row of containers therefrom have one extra container. The second variation, commonly referred to as a No. 2 configuration, shown in FIG. 1b, includes every row of the honeycomb pattern having an equal number of containers. An additional pattern includes the parallel-square pattern, shown in FIG. 1c.

In early prior art, containers were typically patterned while on a palletizing conveyor. Various methods and devices are known in the art for arranging containers into one of the above-mentioned honeycomb patterns while on a conveyor, for example, see U.S. Pat. No. 2,949,179 to Busse. Another known method for arranging containers in a honeycomb pattern is to provide fences or guide rails on opposite sides of a conveyor and allow the cans to pile up on the conveyor and form the honeycomb pattern on their own. This method is often referred to as self-patterning. However, these methods suffer from the defect that they do not effectively provide for consistently voidless honeycomb patterns, i.e. patterns having therein the maximum number of containers.

More recent prior art does include methods and devices directed toward improving upon the devices and processes described above and are discussed below.

U.S. Pat. No. 5,080,551 to Jerred discloses an apparatus for palletizing layers of circular containers arranged in a honeycomb pattern. The apparatus functions to arrange generally circular containers in a honeycomb pattern, wherein the rows are arranged along the direction of conveyor movement. Accordingly, containers of alternate rows are offset relative to containers of the remaining rows. The apparatus comprises partitions for forming a first row of containers and for directing containers transversely to the direction of conveyor movement so that containers nest against previously formed rows to form successively nested rows. The partitions extend generally in the direction of conveyor movement on the upper surface of the conveyor, forming a plurality of lanes each having a width slightly greater than the diameter of the container. The downstream ends of the outermost partitions form a V-shape which opens downstream of the conveyor and which is bisected by the longitudinal axis of the conveyor. When the containers are carried along the upper surface of the conveyor and between the partitions, the center partitions form a center row of containers and the outer partitions direct containers inwardly toward the center row so that containers rest against previously formed rows to form successive rows on both sides of the center row. The device in Jerred suffers from the defect that it is difficult to alternate between the two general honeycomb pattern configurations, as discussed above, while the process is taking place.

U.S. Pat. No. 4,978,275 to Reid et al. discloses a computer controlled article handling device. The device is a palletizer for receiving successive groups of articles in a pattern forming area and transferring the groups in succession to a stacking area on a pallet. A servo-controlled sweep system transfers article groups having the desired pattern to the stacking area for stacking one group on top of the other. The pallet is indexed downward by a hoist system after each successive group. A carriage system interleaves separator sheets between successive groups. A programmable logic controller controls the servo-controlled sweep system in accordance with a velocity characteristic designed to increase machine speed and efficiency. The device is directed primarily to the sweep system for transferring articles from the pattern forming area to the stacking area for stacking as well as to the carriage subsystem and hoist subsystem. That is, no particular device or design is described for use at the pattern forming area. The device is primarily a conventional palletizer with the addition of a programmable logic controller for operating the sweep system, the carriage system and the hoist subsystem. Accordingly, it appears that the device of Reid et al. suffers from the same general defects of the prior art palletizers discussed above, i.e. the tendency to allow the formation of voids and the lack of ability of the device to switch between different patterns including the two types of honeycomb patterns.

U.S. Pat. No. 5,333,722 to Ouellette describing an apparatus for diverting a lane of successive articles to plural lanes and U.S. Pat. No. 5,320,478 to Gonsowski et al. describing a palletizing apparatus and a method for packaging containers, provide additional devices and processes for arranging articles for palletizing. Each of these patents are directed to arranging articles in non-honeycomb type patterns and appear to be more specifically related to the arrangement of packages and non-cylindrical type articles. Accordingly, these devices and processes are not capable of arranging containers in the various patterns including the honeycomb patterns, discussed above.

There exists a need, therefore, for an improved palletizing apparatus device for arranging containers or the like in a variety of patterns, particularly at least two types of honeycomb patterns, and also a parallel-square pattern, and which substantially avoids the formation of voids and jams.

SUMMARY OF THE INVENTION

The primary object of this invention is to provide an apparatus and method for palletizing containers or other objects after arrangement into a desired one of a plurality of configurations at high production speeds.

Another object of this invention is to provide an apparatus and method for palletizing containers or other objects after arrangement into a desired one of a plurality of patterns including various honeycomb and parallel-square patterns, while maintaining the desired pattern.

Yet another object of this invention is to provide an apparatus and method for palletizing containers or other objects after arrangement into a desired honeycomb configuration, and maintaining the desired honeycomb configuration, which avoids the formations of voids in the pattern.

Still another object of this invention is to provide an apparatus and method for palletizing containers or other objects after arrangement into a desired one of at least two types of honeycomb patterns, while maintaining the desired pattern.

And another object of this invention is to provide an apparatus and method for palletizing containers or other objects, which apparatus and method prevent disorientation of containers, preferably by including means for presenting the containers in single file from a molding machine.

The foregoing objects and advantages are obtained by the palletizer and method for palletizing of the present invention for arranging objects in a variety of patterns, including a plurality of honeycomb patterns and a parallel-square pattern. The palletizer comprises means for transporting the objects from an object source, means for maintaining the objects in single file while the means for transporting moves the objects, a first area for receiving groups of the objects comprising a number of the objects arranged into the single file. The first area has a depth to which each of the groups of objects travel after entering the first area. The palletizer further includes means for alternating the depth between a greater and lesser depth such that every other one of the groups extends to the lesser depth and all other ones of the groups extend to the greater depth for forming the objects into the honeycomb pattern and for maintaining the groups at equal depths, as desired, a second area for collecting the objects as the objects are arranged in the honeycomb pattern, and first moving means for moving the groups of the objects into the second area.

In one embodiment, where alternating depths are desired, the greater depth is greater than the lesser depth by substantially one-half the diameter of a one of the objects. The second area of the palletizer preferably has at least two sides, wherein each of the sides includes one of the means for alternating. Also, a first area and a first moving means are positioned adjacent each of the two sides of the second area such that the second area is filled with the objects from both of the sides.

The method for palletizing objects in accordance with the principals of the present invention includes the steps of arranging the objects into single file; receiving the objects arranged in single file groups in a first area having a variable depth; performing one of alternating the variable depth between a greater and lesser depth such that every other one of the groups extends to said lesser depth and all other ones of the groups extend to the greater depth and maintaining the groups at an equal depth; and pushing the groups together and into a second area for forming the objects into the pattern.

The details of the present invention are set out in the following description and drawings wherein like reference characters depict like elements.

BRIEF DESCRIPTION OF THE DRAWINGS

FIG. 3 is an enlarged view of the encircled area of FIG. 4;

DETAILED DESCRIPTION OF THE PREFERRED EMBODIMENT

Figure 2A:
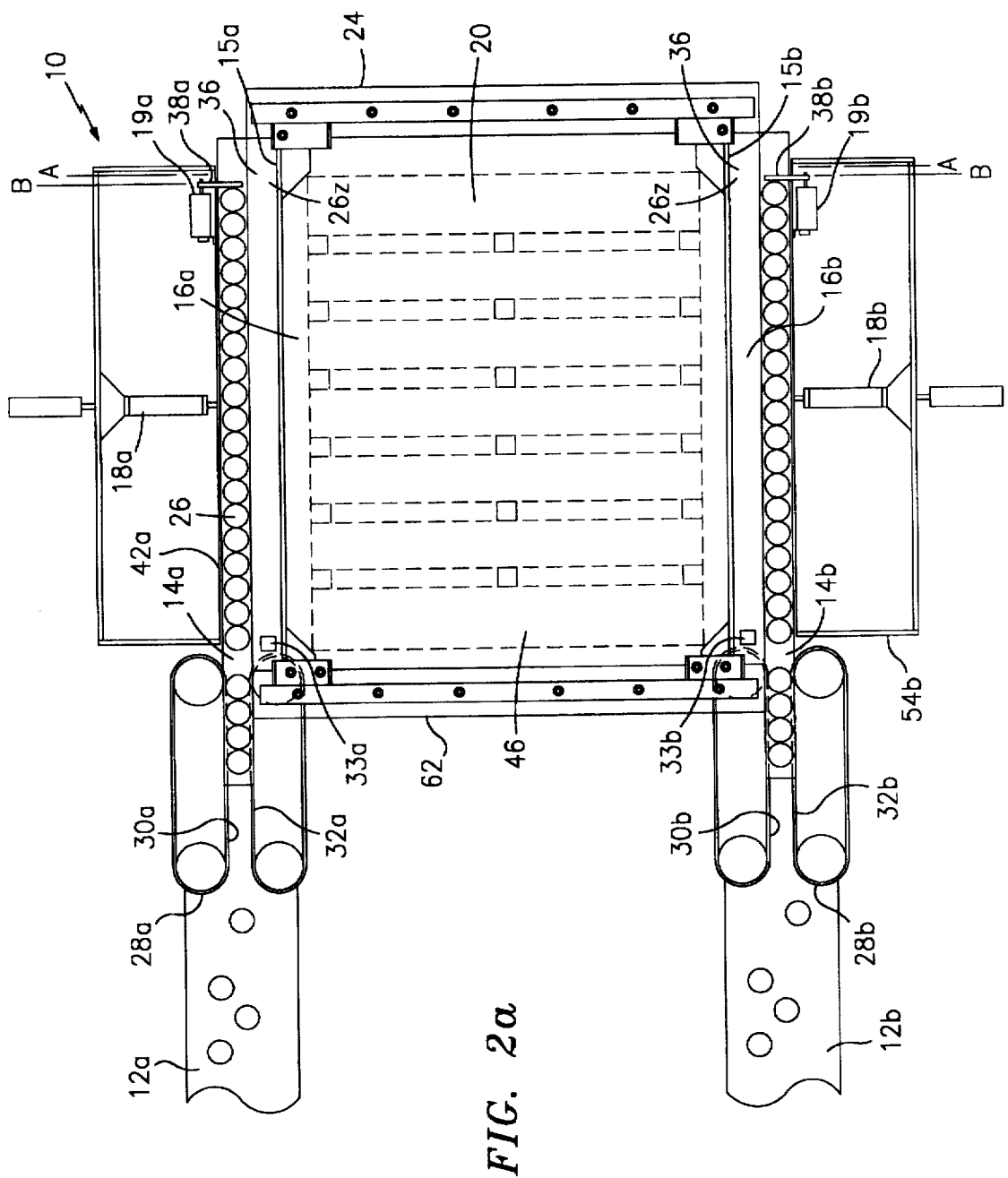
FIG. 2a is an overhead view of the palletizing apparatus in accordance with the principals of the present invention showing a first row of containers thereon.
Figure 2B:
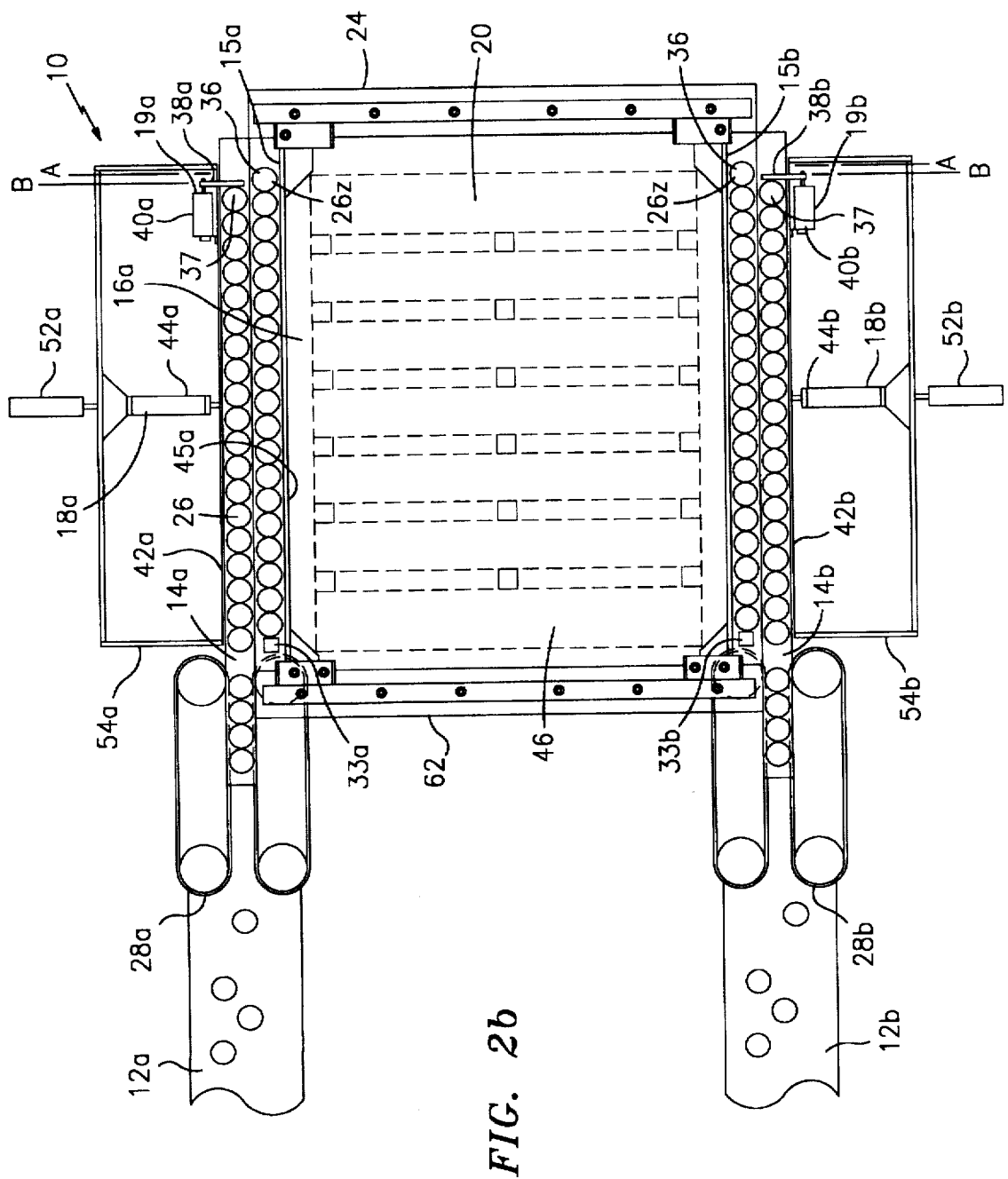
FIG. 2b is similar to FIG. 2a, showing first and second rows of containers in a nested or honeycomb arrangement.

Referring now to the drawings in detail, there is shown in FIGS. 2a and 2b an overhead view of the palletizer of the present invention, designated generally as 10. Palletizer 10 generally includes bottle transporting mechanisms 12a and 12b, receiving rows 14a and 14b, following bars 15a and 15b, apron areas 16a and 16b, first container moving mechanisms 18a and 18b, row depth adjusters 19a and 19b, an object or container collection area 20 defined by a pallet movable on a pallet hoist mechanism 24, which supports the mechanisms described above. Alternatively, a separate pallet hoist mechanism 124 may be used onto which containers are pushed via a second container moving mechanism 122 from collection area 120 (all shown in FIG. 5).

The preferred embodiment of this invention includes two transporting mechanisms 12a and 12b, two receiving rows 14a and 14b, two apron areas 16a and 16b, and two first container moving mechanisms 18a and 18b, and associated features. Since these sets of features are substantially similar to each other, only one of these features of each set, having the "a" designation, will be described in detail, it being understood that the description applies equally to both sets.

Transporting mechanism 12a is preferably in the form of a conveyor belt or the like which functions to transport containers 26, as shown in FIGS. 2a and 2b, towards receiving row 14a. Transporting mechanism 12a directs containers 26 into container alignment and delivery mechanism 28a for arranging or aligning the bottles into single file prior to being patterned. Container alignment and delivery mechanism 28a preferably includes two vertically oriented belts 30a and 32a positioned on each side thereof, wherein the belts are driven by motors and spaced so that only one container can fit therebetween. Belts 30a and 32a function to place and maintain containers in single file and push containers 26 into receiving row 14a. Receiving row 14a is preferably a flat elongated plate in alignment with alignment mechanism 28a so that containers 26 are received in receiving row 14a in the single file arrangement.

Container alignment and delivery mechanism 28 delivers containers 26 into receiving row 14a until the receiving row 14a is filled to a predetermined correct number. The correct number is preferably controlled by a counter/sensor 33a, shown schematically, which is preferably in communication with a controller (not shown) which controls the operation of the various mechanisms of the palletizer. Accordingly, a group of containers 36 are provided wherein the first container 26z entering receiving row 14a abuts against plate 38a of row depth adjuster 19a. Once an entire group 36 is arranged in single file in receiving row 14a, first container moving mechanism 18a is preferably operative, under command 8a programmed controller (not shown), to push group 36 toward the container collection area 20 under the guidance and support of following bar 15a, discussed below. However, prior to the operation of first container moving mechanism 18a, row depth adjuster or alternator 19a is operative on containers 26 and receiving row 14a.

Figure 1A:
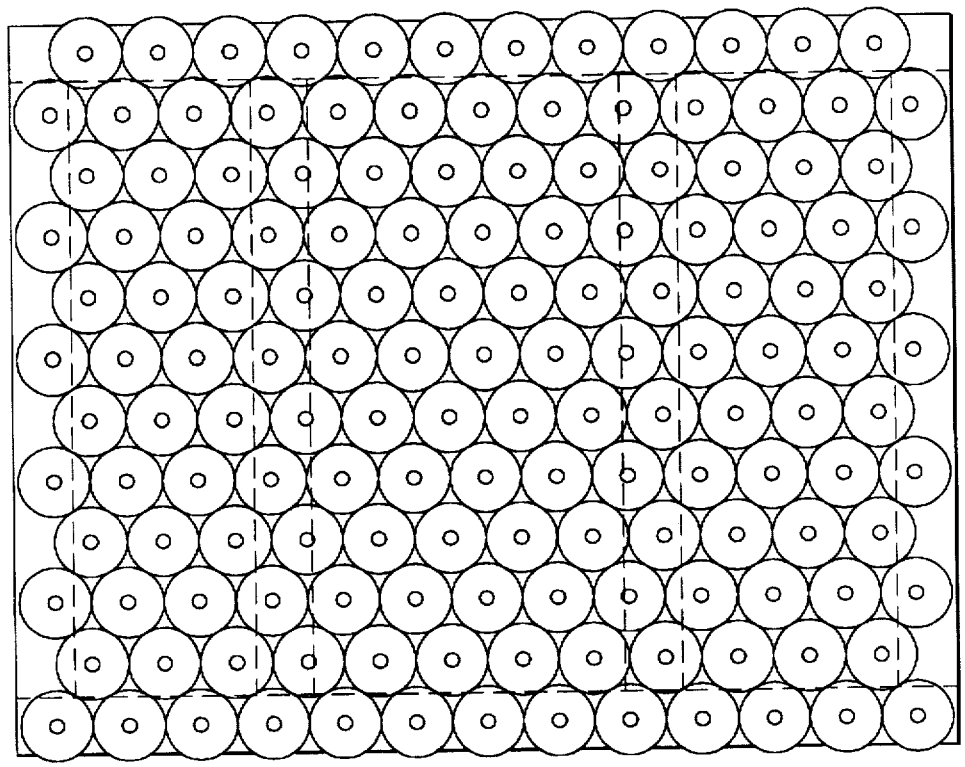
FIGS. 1a–1c are overhead diagrams of patterns used in palletizing objects including No. 1 honeycomb, No. 2 honeycomb, and parallel-square, respectively.
Figure 1B:
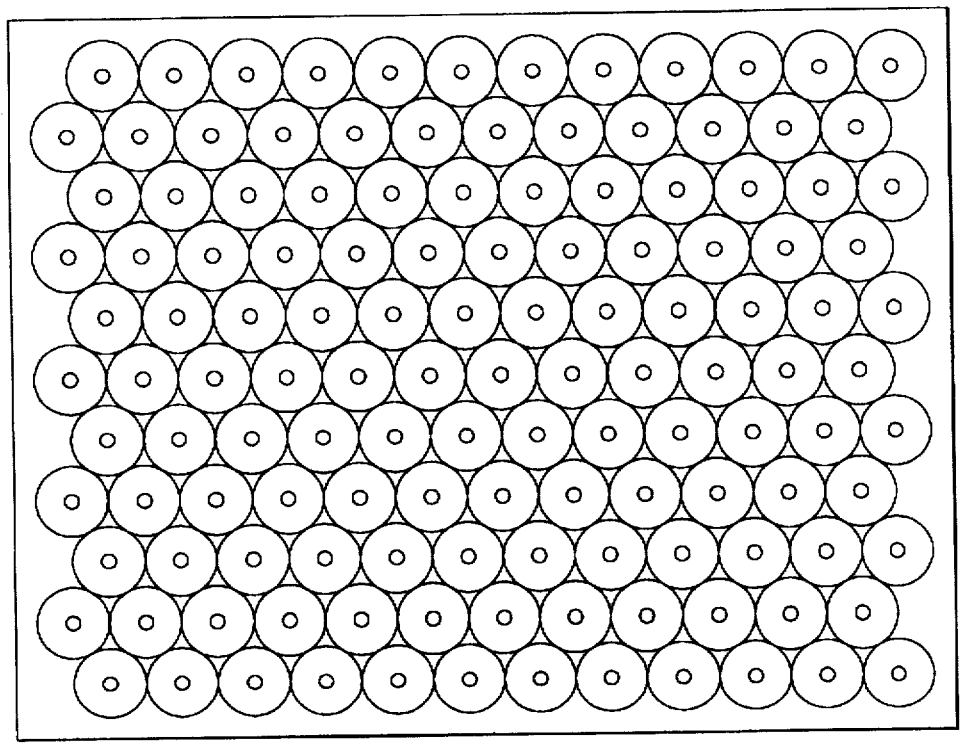

Row depth adjuster 19a moves plate 38a in the longitudinal direction of receiving row 14a toward and away from alignment mechanism 28a. Accordingly, row depth adjuster 19a comprises plate 38a, as shown in FIGS. 2a and 2b, which plate 38a is movable along the longitudinal direction of receiving row 14a via a piston/cylinder assembly 40a connected thereto. Accordingly, due to row depth adjuster 19a, every other row or group of containers placed in receiving row 14a extends to the same depth as defined by plate 38a of row depth adjuster 19a, relative to alignment mechanism 28a. That every other row or group of containers has a lesser depth while the remaining rows or groups of containers have a greater depth, forming a nested or honeycomb pattern, as shown in FIGS. 1a, 1b and 2b. Accordingly, if the first row or group of containers 36 are given a greater depth by the positioning of plate 38a, as shown in FIGS. 1a, 2a and 2b, the second row or group of containers 37 are given a lesser depth. Row depth adjuster 19a thereby changes the depth of receiving row 14a for every row or group of containers 36, 37, etc.

As shown in FIGS. 1a and 1b, two nested patterns can be formed. These patterns are described in the background section. In FIG. 1a, every other has one less container. In FIG. 1b, every other row has the same number of containers yet they are nested and therefore offset by one-half of a container diameter.

Once receiving row 14a is filled with a row or group of containers 36, having a depth as defined by the positioning of plate 38a of row depth adjuster 19a, first container moving mechanism 18a functions to push the row or group of containers 36 toward container collection area 20, a distance substantially equal to the diameter of the containers and under the guidance of following bar 15a to apron area 16a. First container moving mechanism 18a comprises a longitudinal plate 42a extending adjacent receiving row 14a and substantially the entire length of receiving row 14a so as to engage the rows or groups of containers 36 in receiving row 14a.

The first container moving mechanism 18a also includes at least one piston/cylinder assembly 44a connected with plate 42a for pushing plate 42a against rows or groups of containers 36 or 37 for moving the same into apron area 16a and further toward container collection area 20. Accordingly, once first container moving mechanism 18a moves the row or group of containers 36 or 37 into apron 16a, additional containers are fed into receiving row 14a via container alignment and delivery mechanism 28a to the depth of receiving row 14a defined by plate 38a of row depth adjuster 19a.

In the initial stages, apron 16a may be used to start the compilation of the containers while containers in container collection area 20 are being moved away on a pallet 46. Accordingly, the process of compilation of the containers is not interrupted via movement onto a pallet 46.

As shown in FIGS. 2a, 2b, 3 and 4 following bar 15a extends the longitudinal length of receiving row 14a and includes a bar 45a adapted to abut and support containers 26. The bar is movably guided across collection area 20 or pallet 46 preferably via linear bearings 47a and under the control of piston/cylinder mechanism 49a connected to linear bearings 47a, as shown in FIG. 3. Accordingly, the bar provides support to containers 26 as they are pushed inward to collection area 20 or pallet 46, so as to prevent the occurrence of downed bottles.

Referring to FIG. 3, bar 45a is preferably retractable upwardly via piston/cylinder mechanism 43a, which mechanism 43a moves along with bar 45a on linear bearings 47a. Accordingly, in the preferred two sided system, i.e. having following bars 45a and 45b converging on the center of collection area 20 as the number of containers approach collection area capacity, the following bars are each retracted via piston/cylinder mechanisms 43a and 43b, respectively, to allow nesting of the containers. The following bars are preferably retracted at the most effective moment in time so as to allow substantially uninterrupted support thereby throughout the filling of container area 20.

Figure 4:
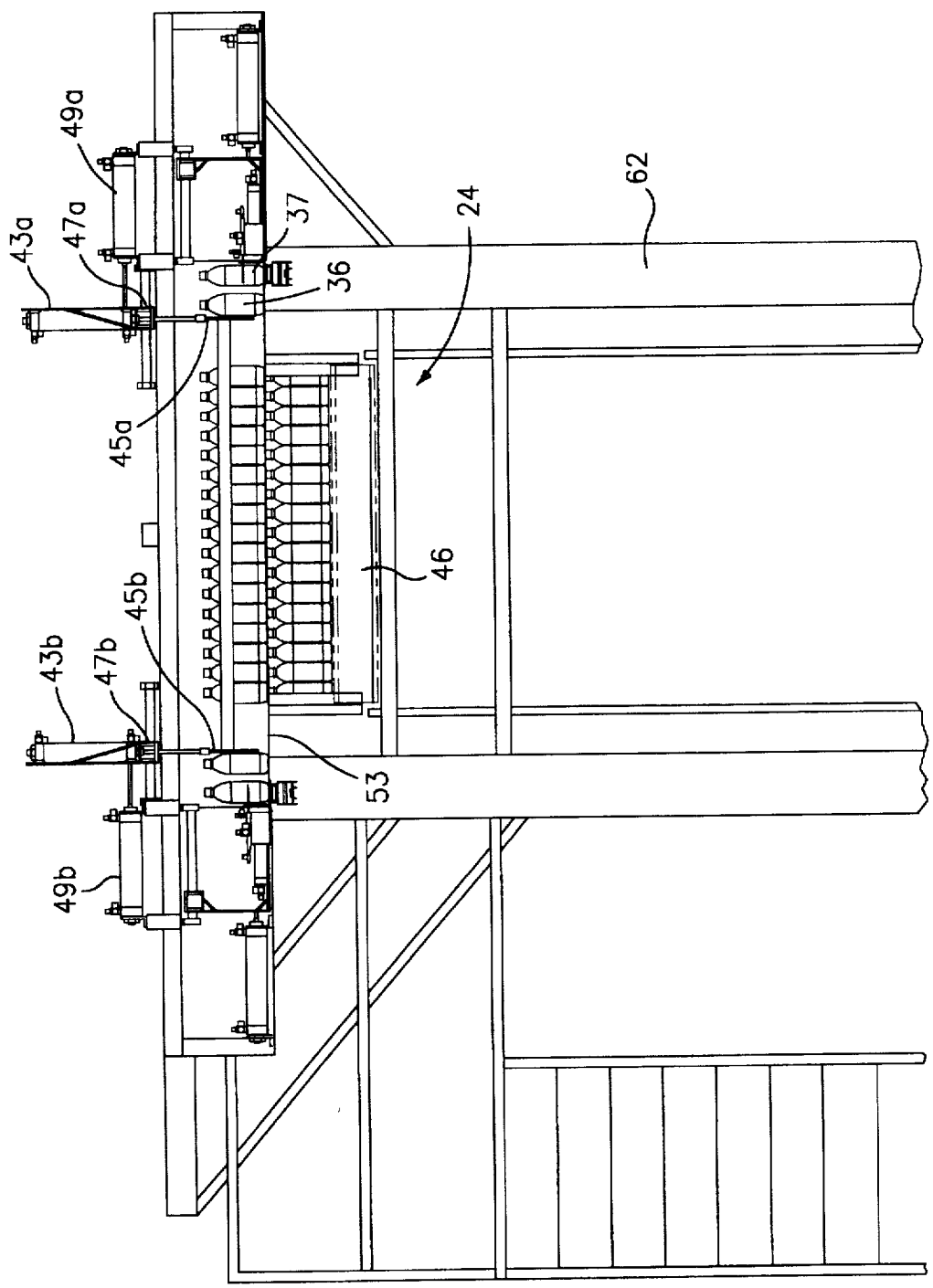
FIG. 4 is an elevational view of the palletizing apparatus shown in FIGS. 2a and 2b in accordance with the principals of the present invention.

Container collection area 20 is preferably the area above pallet 46 while it is positioned on pallet hoist mechanism 24, as shown in FIGS. 2a, 2b and 4. Once container collection area 20 is filled, pallet 46 is simultaneously filled with a tier of containers arranged in the honeycomb pattern.

Container collection area 20 receives rows or groups of containers 36 from receiving rows 14a and 14b via first container moving mechanisms 18a and 18b, until container collection area 20 is filled to its capacity with the containers arranged in a honeycomb pattern, which patterns are shown in FIGS. 1a and 1b. The capacity is preferably substantially equal to the container capacity of pallet 46.

When container collection area 20 or pallet 46 are filled to the point where the addition of rows of containers accumulated in receiving row 14a and apron area 16a will fill it to its capacity, containers 36 are pushed off if receiving row 14a and apron area 16a via an additional piston/cylinder mechanism 52a. Piston/cylinder mechanism 52a is connected with a support structure 54a on which piston/cylinder mechanism 44a is supported. Support structure 54a is advanceable on linear bearings or the like (not shown) toward collection area 20. Accordingly piston/cylinder mechanism 44a and plate 42a are also advanceable via piston/cylinder mechanism 52a.

The stroke of piston/cylinder mechanism 52a is such that plate 42a is moved through a distance and against the rows of containers 26 sufficient to move the same entirely onto collection area and/or pallet 46, completely clearing apron area 16a. Accordingly, apron area 16a may be filled while hoist mechanism 24 prepares for a new tier of containers, as discussed further below. Alternatively, piston 44b may be a double stroke piston such that an additional stroke thereof is sufficient to move plate 42a the distance required for clearing apron area 16a.

Figure 4A:
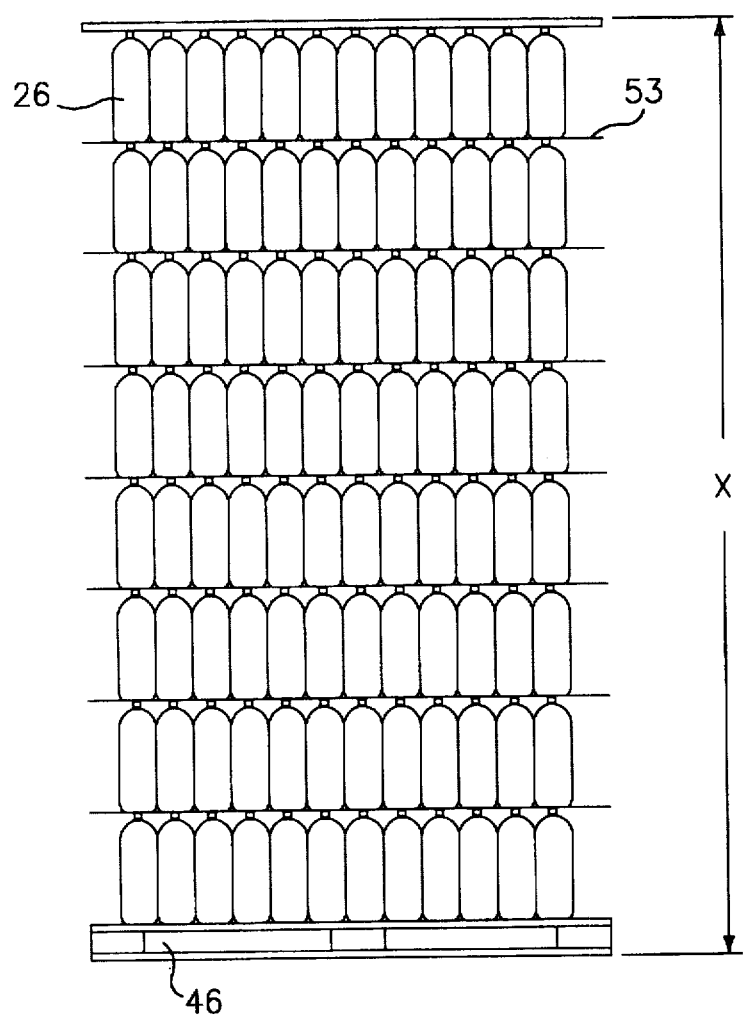
FIG. 4a is an elevational view of a full pallet, shown in the early stages of formation in FIG. 4.

As shown in FIG. 4, in the preferred embodiment, pallet 46 is filled with a first tier of containers and controllably dropped downwardly via hoist mechanism 24 on the support structure 62 thereof, a distance substantially equal to the height of one container. After the filled pallet is dropped downwardly, a partition 53 is extended over the containers, at the level of apron area 16a and 16b, and a new tier of containers is accumulated in the manner discussed above. The new tier is arranged on the new pallet in the same pattern as the containers in the previously filled pallet, so that each container rests over another container of the pallet below. Tiers are continually added, preferably until the pallet 46 can be dropped no further. Accordingly, the pallet with X tiers of containers as shown in FIG. 4a, separated by partitions 53, is then removed from the hoist mechanism for operation on at a subsequent work station.

Figure 5:
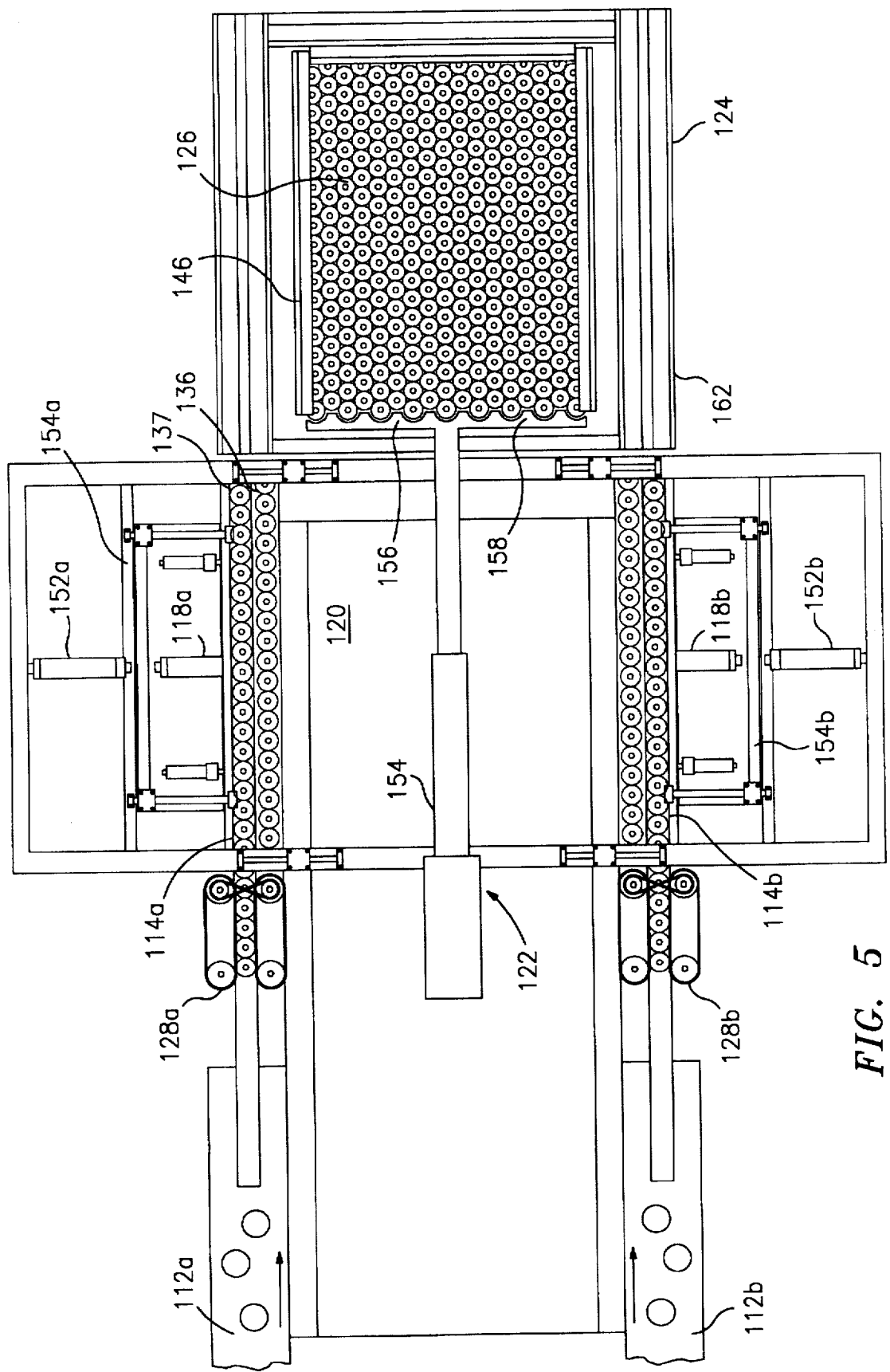
FIG. 5 is an overhead view of an alternative embodiment of the present invention.

As an alternative embodiment, as shown in FIG. 5, where numerals similar to those used with the preferred embodiment designate like elements and a like description, collection area 120 is preferably a separate receiving area in the form of a platform for containers 126, which are then pushed onto an adjacent pallet positioned on an adjacently located hoist mechanism 124. Hoist mechanism 124 functions as described above for hoist mechanism 24, using downward incrementing of the pallet for collecting tiers of containers.

In this alternative embodiment, once container collection area 120 is filled, the second container moving mechanism 122 is operative to move the containers by pushing the same onto pallet 146, located in a separate palletizing area on a hoist mechanism 124. Second container moving mechanism 122 includes a piston/cylinder mechanism 154 attached to a plate 156 adapted to be positioned adjacent rows or groups of containers 136. Plate 156 includes a plurality of fingers 158 on its side adjacent the containers, wherein the fingers are shaped to extend between the rows or groups of containers 137 extending to the lesser depth for maintaining the containers in the honeycomb pattern during movement thereof. Accordingly, plate 156 may be moved via piston/cylinder mechanism 154 against containers 126 for moving containers 126 onto pallet 146.

Figure 1C:
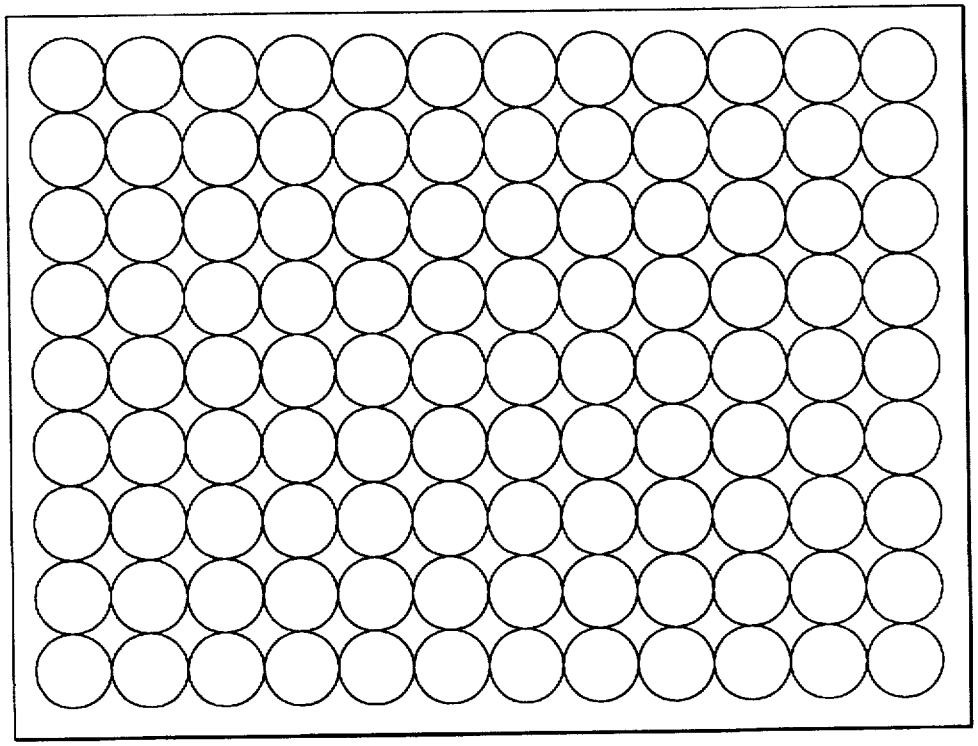
Figure 6:
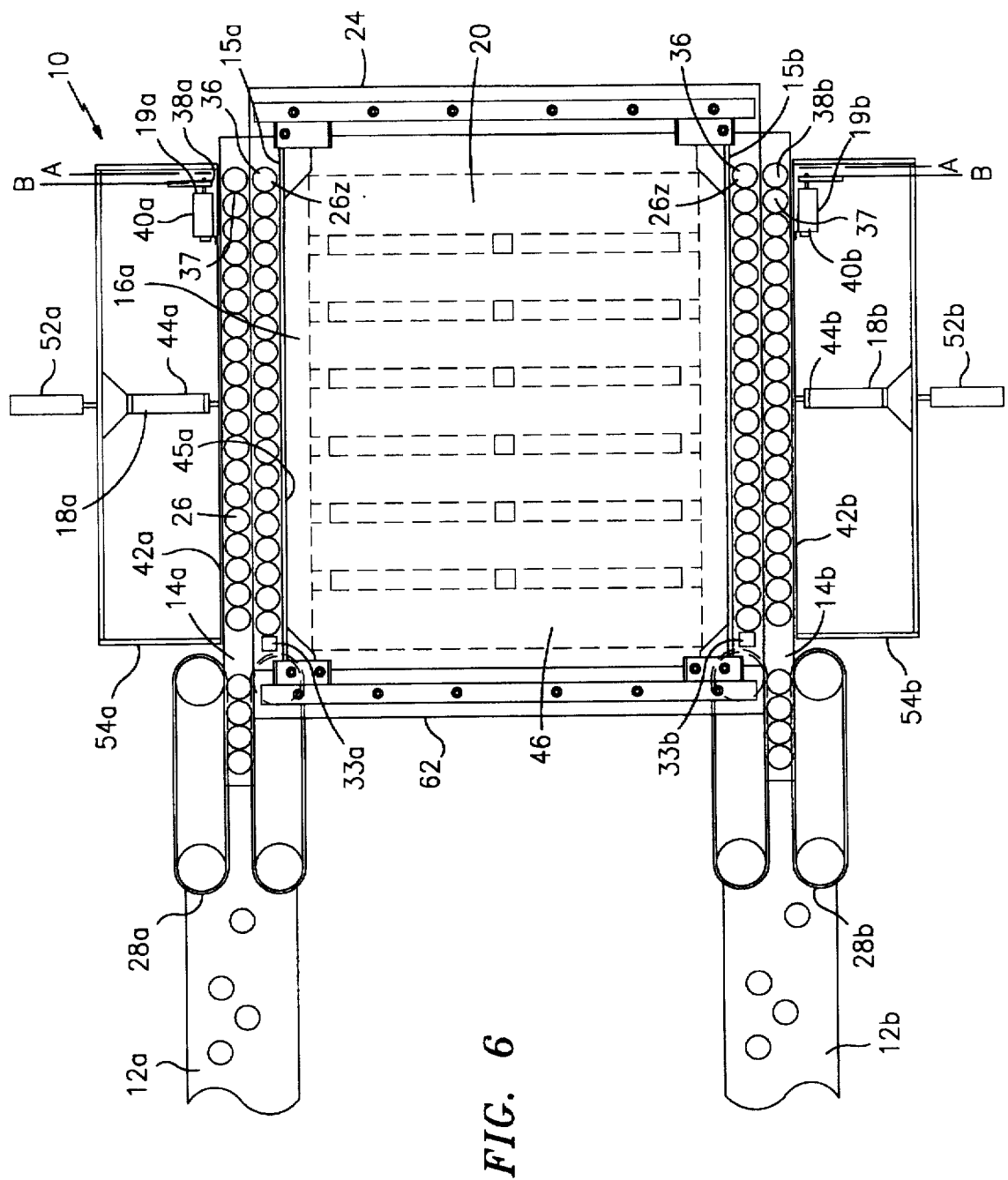
FIG. 6 is an overhead view of an alternative embodiment of the palletizing apparatus shown in FIG. 2b.

As a further alternative embodiment from a processing standpoint, as shown in FIG. 6, instead of alternating the depths of every row to obtain the honeycomb or nested pattern used with nestable objects, the depth may be maintained constant by row depth adjuster 19a. This processing embodiment is preferably used with non-cylindrical objects or other objects which do not nest, although for simplicity circular objects are shown, for forming the parallel-square configuration shown in FIG. 1c and in the early stages in FIG. 6. The parallel-square configuration is formed, therefore, similar to as described above for the nested pattern with the exception that the row-depth adjuster 19a maintains all rows at equal depth. The remaining description set forth above is applicable to the embodiment and incorporation herein, and accordingly, the same reference numerals are used.

While palletizer 10 has been described as using two receiving rows and two of each of the mechanisms associated therewith, this invention also contemplates the use of a single receiving row and associated mechanisms for filling the container collection area with containers arranged in a honeycomb pattern.

In operation, containers 26 are fed from a container source (not shown) via transporting mechanism 12a into alignment and delivery mechanism 28a, which places the containers into single file and delivers the container to receiving row 14a. Containers 26 are fed into receiving row 14a via alignment and delivery mechanism 28a until receiving row 14a is filled to its capacity with containers, forming a row or group of containers 36. Before feeding of the containers is achieved by alignment and delivery mechanism 28a, plate 38a of row depth adjuster 19a may be positioned in one of the lesser or greater depth positions via piston/cylinder mechanism 40a, as shown in FIGS. 2a and 2b.

In the example shown in FIG. 2a, to begin, plate 38a of row depth adjuster 19a may be moved via piston/cylinder assembly 40a to position A on receiving row 14a, away from alignment and delivery mechanism 28a. A row or a group of containers 36 is preferably fed into receiving row 14a until first container 26z abuts up against plate 38a of row depth adjuster 19a. Containers 26 are continually fed into receiving row 14a until receiving row 14a is filled to a predetermined number of containers, as sensed by a sensing device or counter 33a, shown schematically, in communication with alignment and delivery mechanism 28a via controller 34, shown schematically. Once the desired count is reached, under command of controller 34, first container moving mechanism 18a using plate 42a pushes row or group of containers 36 toward the apron area 16a a distance substantially equal to the diameter of containers 26, thereby clearing receiving row 14a for the reception of an additional row or group of containers 37.

Row depth adjuster 19a automatically adjusts the position of plate 38a to the lesser depth position, i.e. position B, whereby plate 38a is moved along receiving row 14a toward alignment and delivery mechanism 28a, a distance equal to one-half the diameter of container 26. Containers are fed into receiving row 14a again via alignment and delivery mechanism 28a until receiving row 14a is filled to capacity, a new end container 26z again abutting plate 38a of row depth adjuster 19a. The count of the containers in group or row 37 may be equal to the number in group or row 36, as shown, or may be greater or less than the count in group or row 36. Since the depth was changed a distance equal to one-half the diameter of container 26, the second row or group of containers 37 are positioned to nest in the original row or group of containers 36, thereby starting the formation of a honeycomb pattern.

At this point, first container moving mechanism 18a functions once again to move containers 26, now arranged in two groups or rows of containers 36 and 37 toward container collection area 20, into apron area 16a. Once collection area 20 is emptied, the process described above continues until container or collection area 20 is again filled with containers 26 arranged in a honeycomb pattern. During the initial stages while apron area 16a is being filled, collection area 20 is preferably being emptied by the pallet hoist mechanism 24. This occurs in both embodiments, in the preferred embodiment where the containers are pushed directly onto the pallet and pallet hoist mechanism 24, as shown in FIGS. 2a, 2b and 4 and where, in the alternative embodiment, the containers are pushed from collection area 120 onto pallet 146 and a separate pallet hoist mechanism 124 via a second container moving mechanism 122, as shown in FIG. 5. In both cases, the simultaneous operations of beginning the honeycomb formation and filling the pallet is achieved.

In order to accomplish simultaneous formation and filling, apron 16a must first be cleared. Accordingly, when the capacity of collection area 20 is such that the addition of the rows or groups of containers positioned in receiving row 14a and apron area 16a will fill it, piston/cylinder mechanism 52a pushes support 54a along with pushing wall 42a and container 26 toward collection area 20 or pallet 46, a distance sufficient to clear the apron area.

Since in the preferred embodiment, containers 26 are also being fed into container collection area 20 from receiving row 14b, approximately half of container collection area 20 is filled by one of the mechanisms discussed above. When two receiving rows 14a and 14b are used, the first group or row of containers fed into receiving rows 14a and 14b should have different depths. That is, receiving row 14a should be adjusted via row depth adjuster 19a to have a lesser depth while receiving row 14b should be adjusted via row depth adjuster 19b to have a greater depth or vice versa. This is preferred, since in order to form a complete voidless honeycomb pattern, the first row or group of containers 36 originating from receiving rows 14a and 14b should be positioned to nest.

Once the container collection area 20 is filled with rows or group of containers 36 from each of receiving rows 14a and 14b and associated mechanisms, container collection area 20 includes all of containers 26 needed to complete one tier on pallet 46. At that point, in the preferred embodiment, wherein collection area 20 is a surface or partition of pallet 46, as described above, pallet 46 is preferably dropped downwardly a distance substantially equal to the height of one container. A partition 53 is placed over the first tier and a second tier is collected in the same manner as the first tier.

In the alternative embodiment shown in FIG. 5, second container moving mechanism 122 is operative to push the groups or rows of containers 136, 137, etc., arranged in the honeycomb pattern, onto pallet 146 which is supported by pallet hoist mechanism 124. In the meantime, for both embodiments, apron 116a continues to receive at least several nested rows of containers.

In both the preferred embodiment and the alternative embodiment, tiers of containers are collected until the pallet has dropped to the bottom of pallet hoist mechanism 24 and can accordingly receive no more containers. For the alternative embodiment, second container moving mechanism 22 returns to its starting position. The process as described above starts all over for again filling container collection area 20 with rows or groups of containers 36, 37, etc., arranged in the desired honeycomb pattern.

When a pallet is filled with x number of tiers of containers, it is then moved with each tier arranged in the desired honeycomb pattern to a new work station.

The primary advantage of this invention is that an apparatus and method for palletizing containers or other objects into a plurality of configurations at high production speeds is provided. Yet another advantage of this invention is that an apparatus and method for palletizing containers or other objects into desired honeycomb configurations is provided which avoids the formations of voids in the pattern. Still another advantage of this invention is that an apparatus and method for palletizing containers or other objects into at least two types of honeycomb patterns is provided. And still another advantage of this invention is that an apparatus and method are provided for palletizing containers or other objects, which apparatus and method prevent disorientation of containers, preferably by including means for presenting the containers in single file from a molding machine. And another advantage of this invention is that an apparatus and method are provided for palletizing containers or other objects into a plurality of patterns including various honeycomb and parallel-square patterns.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A palletizer for arranging objects in a pattern, comprising:

means for transporting said objects from an object source to a means for arranging said objects;

means for maintaining said objects in single file while said means for transporting moves said objects toward said means for arranging;

a first area for receiving groups of said objects comprising a number of said objects arranged into said single file, said first area having a depth to which each of said groups of objects travel after entering said first area;

means for controlling said depth to which said groups of objects travel;

a second area for collecting said objects as said objects are arranged in said pattern;

first moving means for moving said groups of said objects into said second area; and wherein said means for controlling includes means for alternating said depth between a greater and lesser depth such that every other one of said groups extends to said lesser depth and all other ones of said groups extend to said greater depth for forming said objects into a honeycomb pattern and for maintaining said groups at equal depths, as desired; and wherein said second area includes at least two sides, wherein each of said sides includes one of said means for alternating and maintaining, and wherein a first area and a first moving means are positioned at each of said two sides of said second area such that said second area is filled with said objects from both of said sides.

2. The palletizer according to claim 1, wherein said objects have a diameter, and wherein if it is desired that said groups of said objects be alternating in depth via said means for alternating and maintaining, said greater depth is greater than said lesser depth by substantially one-half the diameter of a one of said objects.

3. The palletizer according to claim 1, further including a second moving means for moving said objects arranged in said pattern onto a pallet.

4. The palletizer according to claim 1, wherein said second area is a pallet.

5. The palletizer according to claim 4, wherein said first area comprises an object receiving row and a stationary apron area, said first moving means further for moving said objects from said receiving area to said apron.

6. The palletizer according to claim 1, wherein said means for alternating and maintaining said depth comprises a movable plate positioned at an end of said first area and which defines said depth to which said objects of said group travel, wherein said movable plate is movable between positions required to form said lesser, said greater and said equal depths.

7. The palletizer according to claim 6, wherein said first area extends in a longitudinal direction and said movable plate is movable in said first area in said longitudinal direction.

8. The palletizer according to claim 6, wherein each of said groups of objects includes an end object and said movable plate is adapted to engage said end object.

9. The palletizer according to claim 1, wherein if said groups are desired to be placed in alternating depths, said groups traveling to said lesser depth include a lesser number of objects than said groups traveling to said greater depth.

10. The palletizer according to claim 1, wherein if said groups are desired to be placed in alternating depths, said groups traveling to said lesser depth include an equal number of objects than said groups traveling to said greater depth.

11. The palletizer according to claim 1, wherein said first moving means is positioned adjacent said first area.

12. The palletizer according to claim 11, wherein said first moving means comprises a piston and plate assembly adapted to push an entire one of said groups of said objects toward said second area when said first area is filled with an entire one of said groups of said objects so as to make room for another one of said groups of said objects.

13. The palletizer according to claim 1, wherein said objects have a diameter and said first moving means is operative to move said groups of said objects toward said second area by incremental distances substantially equal to said diameter of said objects.

14. The palletizer according to claim 13, wherein said first moving means is programmable and adapted to push said groups of said objects toward said second area until said second area is filled with a number of said objects equal to a number of said objects in which a pallet adapted to receive said objects is designed to hold.

15. The palletizer according to claim 1, wherein said objects are cylindrically shaped containers.

16. The palletizer according to claim 1, further comprising a means for supporting said objects when said first moving means moves said objects.

17. The palletizer according to claim 16, wherein said means for supporting comprises a following bar adapted to abut said containers during movement into said first and said second areas.

18. The palletizer according to claim 17, wherein said following bar extends substantially parallel to said groups of said objects and is attached to means for movably guiding the following bar such that when said first moving means moves said groups of said objects, said following bar moves along with said groups of said objects.

19. The palletizer according to claim 1, further including supplemental moving means for moving said groups of said objects into said second area from said first area for clearing said first area.

20. The palletizer according to claim 19, wherein said first moving means is positioned on a support which is movable relative to said second area, and wherein said supplemental moving means is connected with said support such that upon actuation of said supplemental moving means, said support and said first moving means are moved toward said second area and said first area is cleared of said objects.

* * * * *